United States Patent
Kumagai et al.

(10) Patent No.: US 7,535,491 B1
(45) Date of Patent: May 19, 2009

(54) DETECTING AND USING MODE/SETTING INFORMATION

(75) Inventors: Atsushi Kumagai, Kawasaki (JP); Hideo Takiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,586

(22) Filed: May 17, 2000

(30) Foreign Application Priority Data

May 20, 1999 (JP) ................... 11-140729

(51) Int. Cl.
H04N 5/232 (2006.01)
(52) U.S. Cl. .................. 348/211.1; 348/207.1
(58) Field of Classification Search ............ 348/207.1, 348/211.1, 552, 207.11, 231.6, 207.2, 211.3, 348/20.11, 211.99, 211.8, 211.4, 211.9, 333.02, 348/211.2, 211.5, 211.7, 211.11, 211.12, 348/211.6, 211.16, 211.14, 211.13, 333.04, 348/333.12, 231.3, 231.9; 710/14
See application file for complete search history.

(56) References Cited

U.S. PATENT DOCUMENTS

| | | | | |
|---|---|---|---|---|
| 5,231,501 A * | 7/1993 | Sakai | | 348/231.9 |
| 5,706,411 A * | 1/1998 | McCormick et al. | | 358/1.14 |
| 5,745,809 A * | 4/1998 | Kawahata | | 396/287 |
| 5,808,672 A * | 9/1998 | Wakabayashi et al. | | 348/220.1 |
| 6,006,039 A * | 12/1999 | Steinberg et al. | | 396/57 |
| 6,169,854 B1 * | 1/2001 | Hasegawa et al. | | 396/56 |
| 6,256,063 B1 * | 7/2001 | Saito et al. | | 348/231.99 |
| 6,259,469 B1 * | 7/2001 | Ejima et al. | | 348/14.01 |
| 6,296,570 B1 * | 10/2001 | Miyamoto et al. | | 463/30 |
| 6,360,362 B1 * | 3/2002 | Fichtner et al. | | 717/168 |
| 6,397,187 B1 * | 5/2002 | Vriens et al. | | 704/275 |
| 6,486,914 B1 * | 11/2002 | Anderson | | 348/333.02 |
| 6,512,919 B2 * | 1/2003 | Ogasawara | | 455/422.1 |
| 6,552,743 B1 * | 4/2003 | Rissman | | 348/207.2 |
| 6,819,355 B1 * | 11/2004 | Niikawa | | 348/207.11 |
| 6,867,800 B1 * | 3/2005 | Fukasaka et al. | | 348/207.1 |
| 6,947,075 B1 * | 9/2005 | Niikawa | | 348/211.14 |
| 7,019,778 B1 * | 3/2006 | Prabhu et al. | | 348/333.01 |
| 2002/0105582 A1 * | 8/2002 | Ikeda | | 348/231.3 |
| 2002/0196345 A1 * | 12/2002 | No | | 348/207.2 |
| 2003/0016378 A1 * | 1/2003 | Ozawa et al. | | 358/1.13 |
| 2003/0038880 A1 * | 2/2003 | No | | 348/207.1 |
| 2003/0160869 A1 * | 8/2003 | Koyama | | 348/207.1 |

FOREIGN PATENT DOCUMENTS

| | | |
|---|---|---|
| EP | 860978 A2 * | 8/1998 |
| EP | 905554 A2 * | 3/1999 |
| JP | 9-128129 | 5/1997 |
| JP | 10-250047 | 9/1998 |
| JP | 11-024877 | 1/1999 |

* cited by examiner

Primary Examiner—Lin Ye
Assistant Examiner—Nelson D Hernández
(74) Attorney, Agent, or Firm—Fitzpatrick, Cella, Harper & Scinto

(57) ABSTRACT

In order to provide an information processing apparatus which has improved operability and can obviate the need for setting operation of the apparatus, when an external apparatus (portable terminal apparatus) is connected to the information processing apparatus (computer apparatus), the information processing apparatus detects the current setting (setting of a display language or the like) of the external apparatus, and changes its own setting on the basis of the detection result. For example, when the external apparatus is connected to the information processing apparatus, the setting in the information processing apparatus is automatically changed in correspondence with that in the external apparatus.

12 Claims, 18 Drawing Sheets

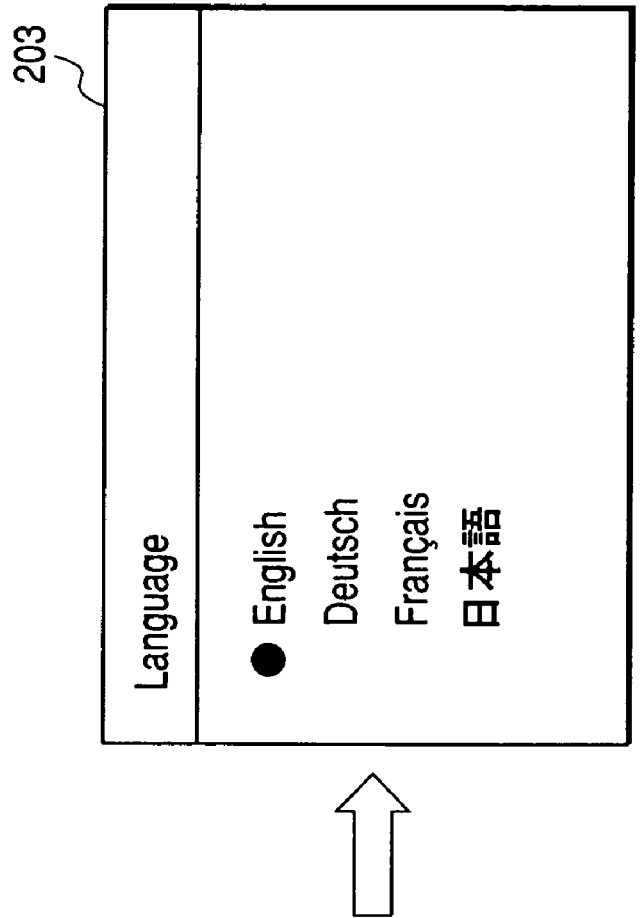
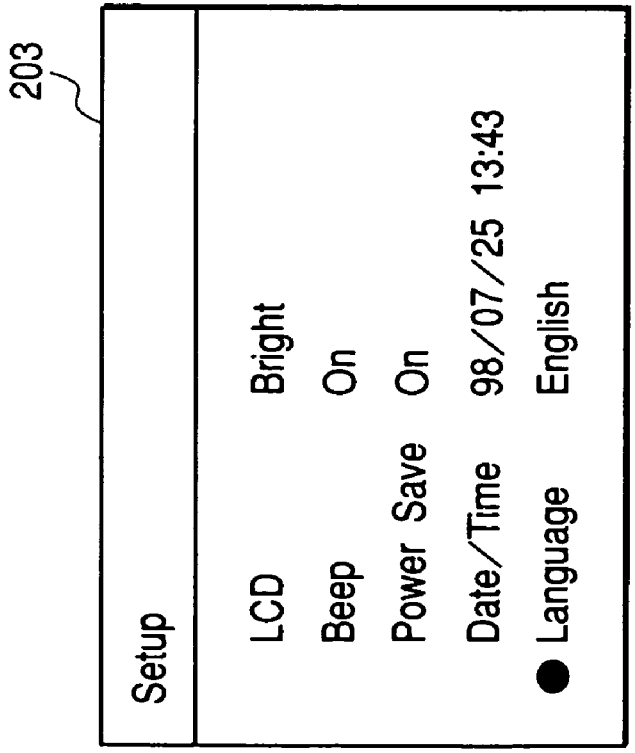

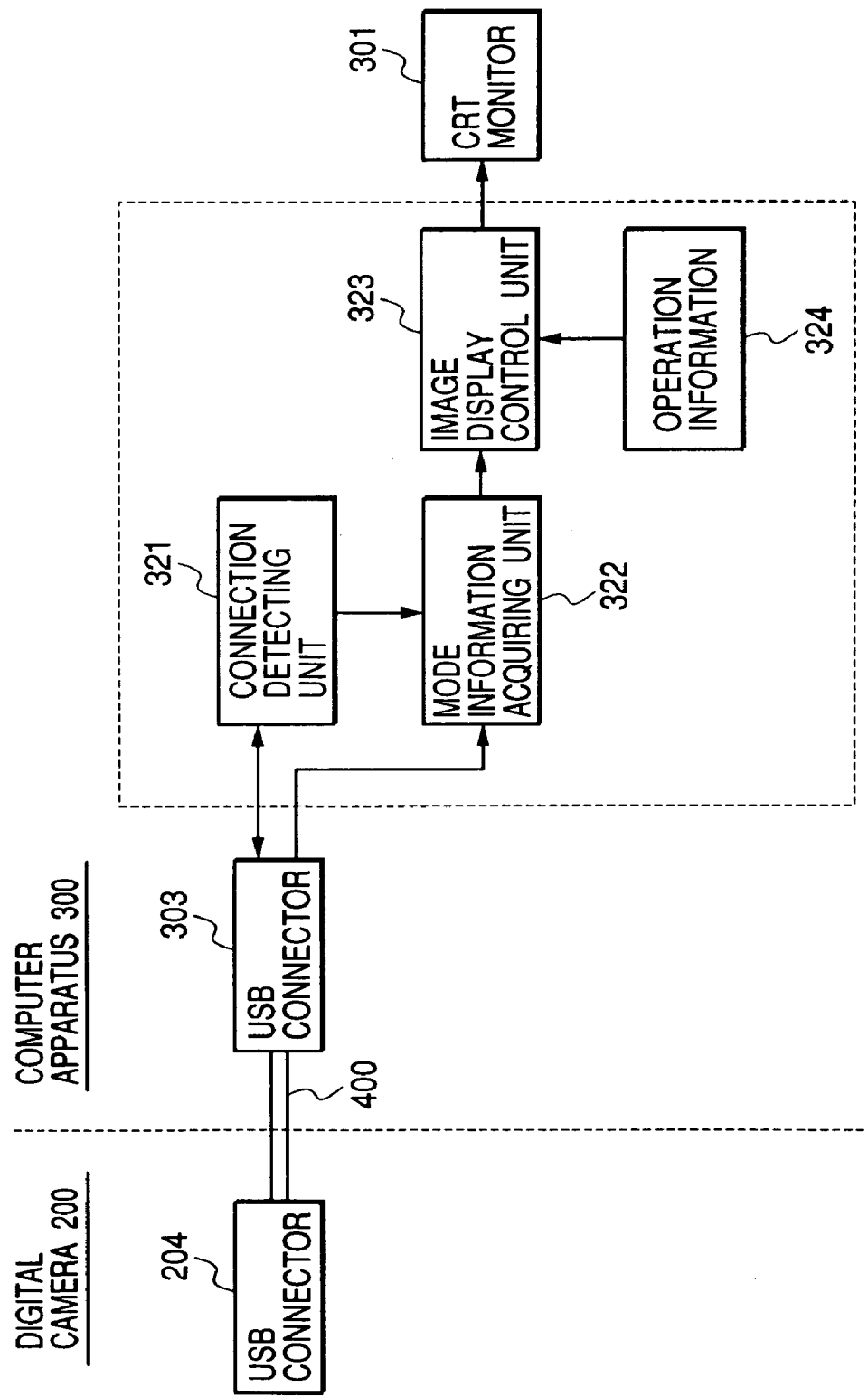

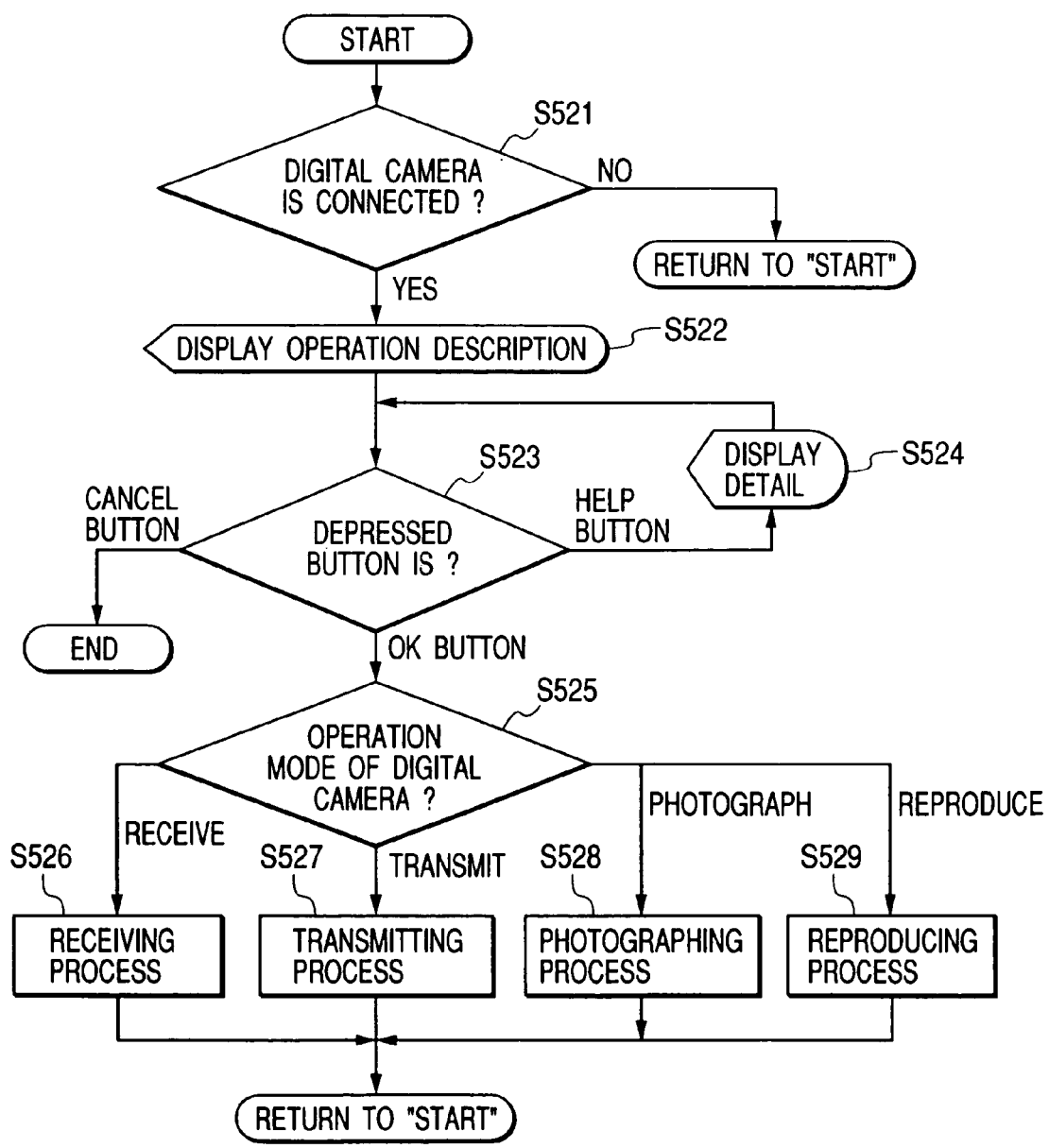

DETECTING AND USING MODE/SETTING INFORMATION

BACKGROUND OF THE INVENTION

1. Field of the Invention

The present invention relates to a technique for making data communications and information display between a terminal apparatus such as a digital camera, PDA (Personal Digital Assistants, to be also referred to as a "portable terminal apparatus" hereinafter), or the like, and a computer apparatus such as a personal computer or the like.

2. Related Background Art

Conventionally, a system in which a terminal apparatus such as a digital camera, PDA (portable terminal apparatus), or the like, which can input and display image data, text data, and the like, is connected to a computer apparatus which can record and display data, and in which data can be transferred from the terminal apparatus to the computer apparatus or vice versa is known.

The aforementioned terminal apparatus, for example, a commercially available digital camera, normally has an RS232C serial communication port. By directly connecting the serial communication port of the digital camera to that of the computer apparatus, data transfer can be done between them. As such connection means between the terminal apparatus and computer apparatus, parallel communications, infrared ray communications, or the like are normally used in addition to the aforementioned serial communications.

The aforementioned terminal apparatus includes those which can select operation modes such as data input, data transfer, list display, and the like by means of, e.g., physical switches, a menu displayed on a display unit, or the like.

More specifically, a digital camera which comprises a select switch for a photographing mode and communication mode is available. This digital camera mainly has the following arrangement. In the photographing mode, data is input (i.e., photographing operation for capturing an image) is done upon depression of a release button, but no data is transferred between the camera and the computer apparatus at that time. On the other hand, in the communication mode, data is transferred between the camera and the computer apparatus, but no photographing is done at that time. According to the selected operation mode, the release button is disabled in the communication mode. In this manner, any operation errors can be prevented. Also, when the function of a given operation switch is switched in correspondence with the selected operation mode, a plurality of functions can be provided to a single operation switch. As a result, the total number of operation switches can be decreased.

Meanwhile, a digital camera with the following arrangement is available. A menu is displayed on a liquid crystal screen as a display unit, and a language used to display the menu or information on the liquid crystal screen is switched to a display language (Japanese, English, or the like) set on the menu. In this fashion, a single digital camera can be used in various countries.

Also, some computer apparatuses and application software programs used in the computer apparatus can change the way data is displayed by changing their settings. For example, "Windows" available from Microsoft Corp. has a function to set the display language (Japanese, English, or the like). When the display language is changed by using this function, language used in the user interface of an application running on the Windows is changed.

Also, in the computer apparatus, when the terminal apparatus is connected to the apparatus, this connection is detected and a state of the connected terminal apparatus is detected. Further, when the state of the connected terminal apparatus is changed, it is possible to detect the changed state by some computer apparatuses. For example, a personal computer (to be simply referred to as a "PC" or the like) on which "Windows98" available from Microsoft Corp. is installed can detect the state of a device connected via the USB (Universal Serial Bus).

However, in the aforementioned conventional computer apparatus, especially, the conventional computer apparatus that can change the data display method, when a plurality of users use that computer apparatus and individually set the apparatus in the ways they want, each user must switch the setups of the previous user to his or her setups. When the user uses a given computer apparatus for the first time, such operation is required. That is, conventionally, when the user uses a computer apparatus for the first time, or when a plurality of users who use different setups share a single computer apparatus, they must change the setups of the computer apparatus every time they use it.

In the aforementioned conventional terminal apparatus, especially, the conventional terminal apparatus which can be used while switching the operation mode, a plurality of functions can be assigned to a single operation switch, and the total number of operation switches can be decreased. However, the user must learn the functions of the operation switches in the respective operation modes. This may disturb easy learning about operations of the terminal apparatus.

SUMMARY OF THE INVENTION

It is an object of the present invention to solve all or at least one of the aforementioned problems.

It is another object of the present invention to provide an information processing apparatus and information processing system with improved operability, and operation control method, and a storage medium which computer-readably stores processing steps that implement the method.

It is still another object of the present invention to obviate the need for setting operations of an information processing apparatus.

It is still another object of the present invention to change, in accordance with the setups of one information processing apparatus connected, those of one information processing apparatus.

In order to achieve the above objects, there is disclosed an information processing apparatus connected to an external apparatus to be able to communicate therewith, comprising:

a setting detecting unit for detecting a predetermined setting in the connected external apparatus; and a setting changing unit for changing a setting assigned in advance to the information processing apparatus in accordance with the predetermined setting on the basis of a detection result of the setting detecting unit.

It is still another object of the present invention to change, in accordance with the settings of one information processing apparatus, those of one information processing apparatus by only connecting the information processing apparatuses.

In order to achieve the above object, there is disclosed an information processing apparatus further comprising:

a connection detecting unit for detecting if the external apparatus is connected, and wherein the setting detecting unit detects the setting on the basis of a detection result of the connection detecting unit.

It is still another object of the present invention to change the settings of software in accordance with an external device connected.

In order to achieve the above object, there is disclosed an information processing apparatus wherein the setting changing unit changes a setting of software which runs on the information processing apparatus in accordance with the connected external apparatus.

It is still another object of the present invention to obviate the need for setting operation of a display language. In order to achieve this object, there is disclosed an information processing apparatus wherein the predetermined setting includes a setting of a display language.

It is still another object of the present invention to obviate the need for setting operation of an information processing apparatus when a portable terminal apparatus which can select one of a plurality of operation modes is used.

In order to achieve the above object, there is disclosed an information processing apparatus wherein at least one of the external apparatus and the information processing apparatus includes a portable terminal apparatus which can selectively use a plurality of operation modes.

It is still another object of the present invention to obviate the need for setting operation of an information processing apparatus when a portable terminal apparatus which comprises an image sensing unit is used.

In order to achieve the above object, there is disclosed an information processing apparatus wherein the information processing apparatus is a portable terminal apparatus having an image sensing unit.

It is still another object of the present invention to prevent the user from failing to understand the operation method upon connecting an information processing apparatus.

Other objects and features of the present invention will become apparatus from the following description of the embodiments taken in conjunction with the accompanying drawings.

BRIEF DESCRIPTION OF THE DRAWINGS

FIGS. 3A and 3B are views for explaining the setups of a display language in the digital camera;

FIGS. 4A and 4B are views for explaining the display state wherein an English setup has been done by setting the display language;

FIG. 11 is a block diagram showing the internal arrangement of a computer apparatus in the second embodiment;

FIG. 21 is a flow chart for explaining the operation of the computer apparatus.

DETAILED DESCRIPTION OF THE PREFERRED EMBODIMENTS

The preferred embodiments of the present invention will be described hereinafter with reference to the accompanying drawings.

First Embodiment

Figure 1:
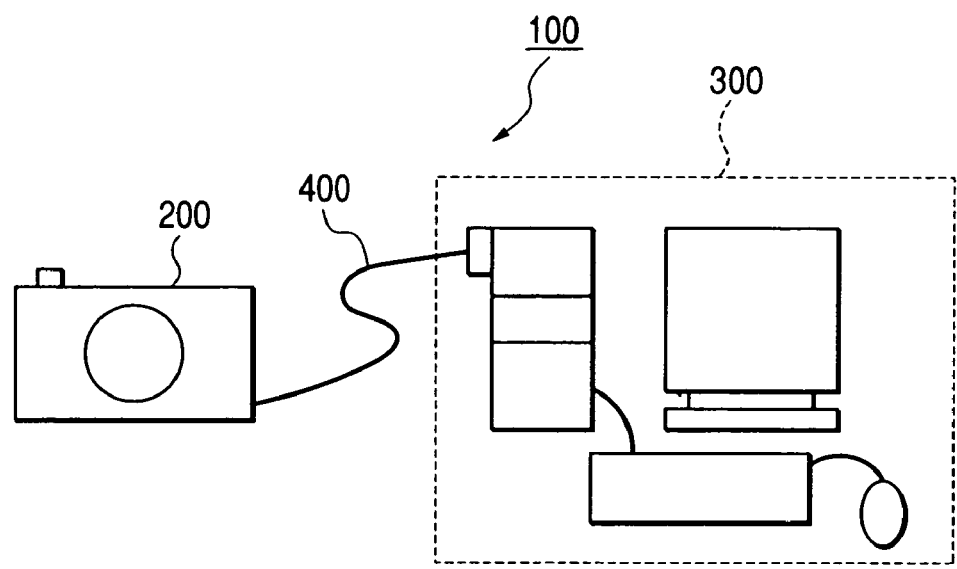
FIG. 1 is a view for explaining the arrangement of a data communication system to which the present invention is applied in the first embodiment.

The present invention is applied to, e.g., a data communication system 100, as shown in FIG. 1. In this data communication system 100, a digital camera 200 and computer apparatus 300 as information processing apparatuses are connectable. The digital camera 200 is a portable terminal apparatus, and transfers input data (photographed image data, or the like) to the computer apparatus 300 via a USB cable 400. The computer apparatus 300 can display a list of data transferred from the digital camera 200 on a display device (to be described later). The digital camera 200 and computer apparatus 300 in the data communication system 100 will be described in detail below.

[Arrangement of Digital Camera 200]

Figure 2A:
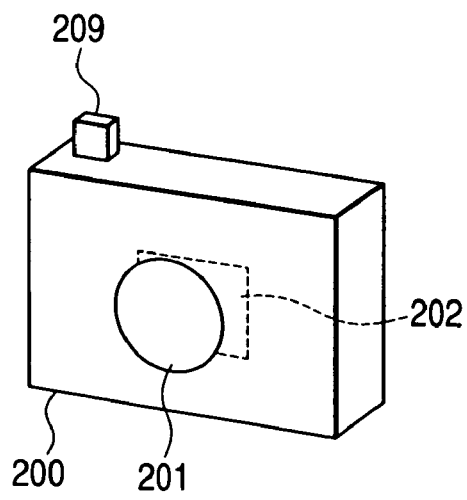
FIGS. 2A and 2B are perspective views for explaining the arrangement of a digital camera in the data communication system.
Figure 2B:
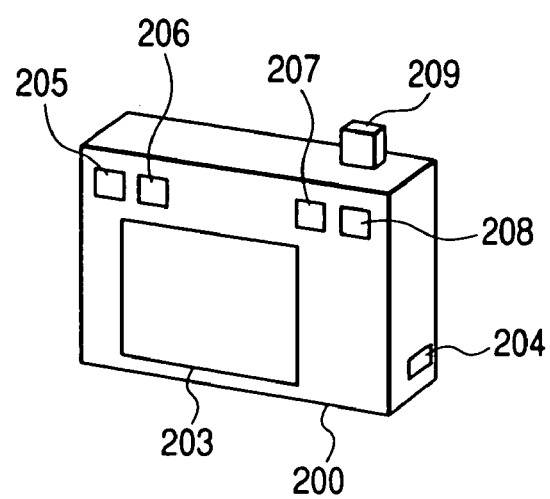

FIGS. 2A and 2B are respectively front and rear views showing the arrangement of the digital camera 200.

As shown in FIG. 2A, a photographing lens 201 is provided to the front surface of the digital camera 200, and a CCD (Charge Coupled Device) 202 is provided therein. The CCD 202 serves as data input unit, senses incoming object light via the photographing lens 201, and outputs its image signal. As shown in FIG. 2B, a liquid crystal monitor 203 as data display unit, a menu button 205, a set button 206, a + button 207, and a – button 208 are provided on the rear surface of the digital camera 200. Furthermore, a release button 209 is provided to the upper surface of the digital camera 200, and a USB connector 204 as data transfer unit is provided to its side surface.

In the aforementioned digital camera 200, the display language can be set on the menu screen displayed on the liquid crystal monitor 203 upon pressing the menu button 205. FIGS. 3A and 3B show an example of the menu screen used to set the display language. When an item "language" is selected on the menu screen shown in FIG. 3A, a display language setup screen shown in FIG. 3B is displayed. On this screen, a desired one of various languages such as "English", "Deutsch", "Français", and the like can be selected. For example, when "English" is selected and set on such display language setup screen, the contents on the liquid crystal monitor 203 are displayed in English, as shown in FIGS. 4A and 4B. FIGS. 4A and 4B show the menu screen for setting the display language corresponding to FIGS. 3A and 3B.

[Arrangement of Computer Apparatus 300]

Figure 5:
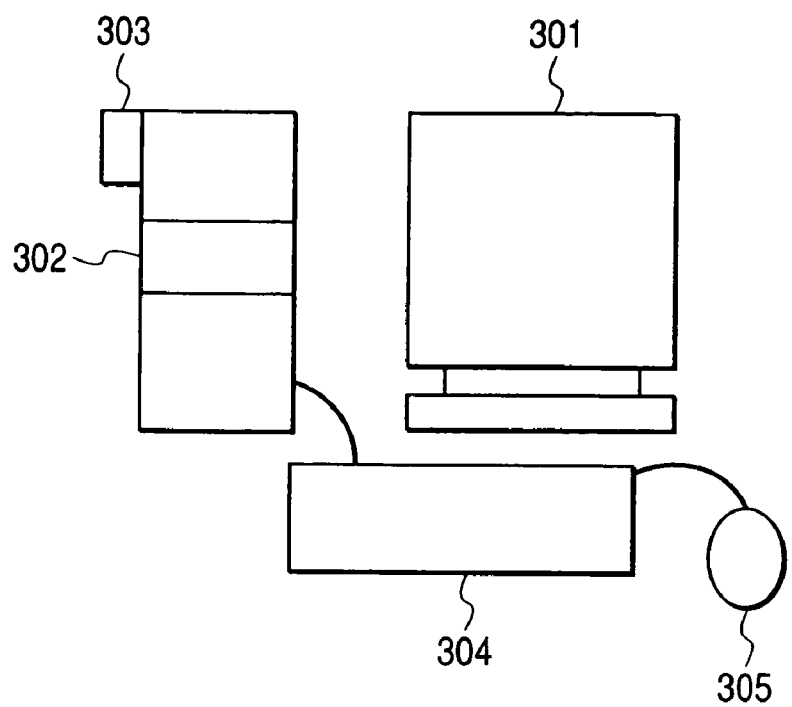
FIG. 5 is a view for explaining the arrangement of a computer apparatus in the data communication system.

The computer apparatus 300 comprises a CRT monitor 301 as data display unit, a hard disk drive 302 as data recording unit, and a USB connector 303 as data transfer unit, as shown in, e.g., FIG. 5. Also, the computer apparatus 300 comprises a keyboard 304 and mouse 305 used in various operations.

In the computer apparatus 300, image capturing software is ready to launch. With this software, when the digital camera 200 is connected to the USB connector 303, image data can be captured from the digital camera 200, and the captured data can be displayed on the CRT monitor 301. In such image capturing software, the display language can be switched by setting.

Figure 6:
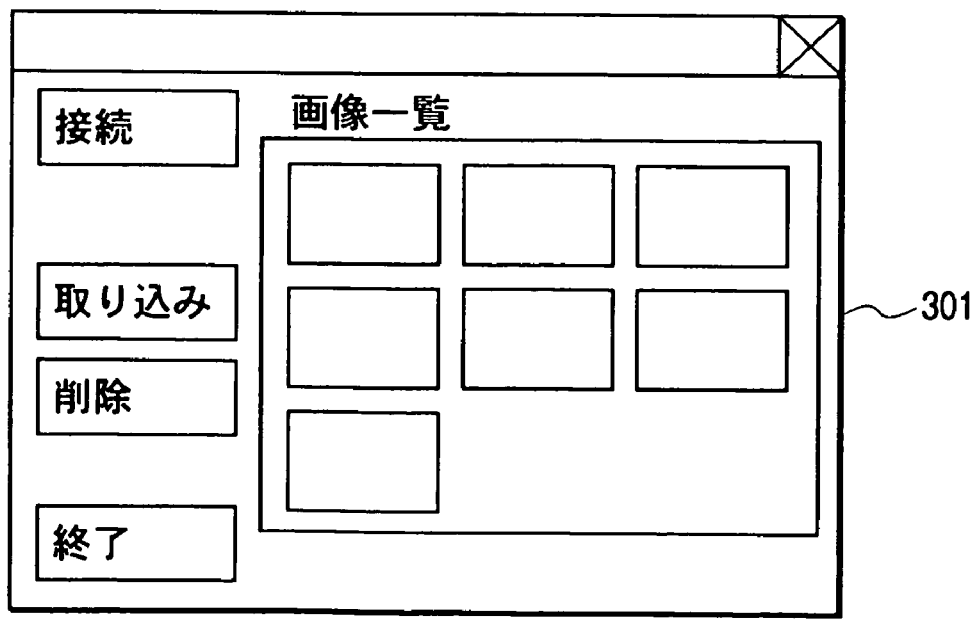
FIG. 6 is a view for explaining a display screen upon launching image capturing software on the computer apparatus.
Figure 7:
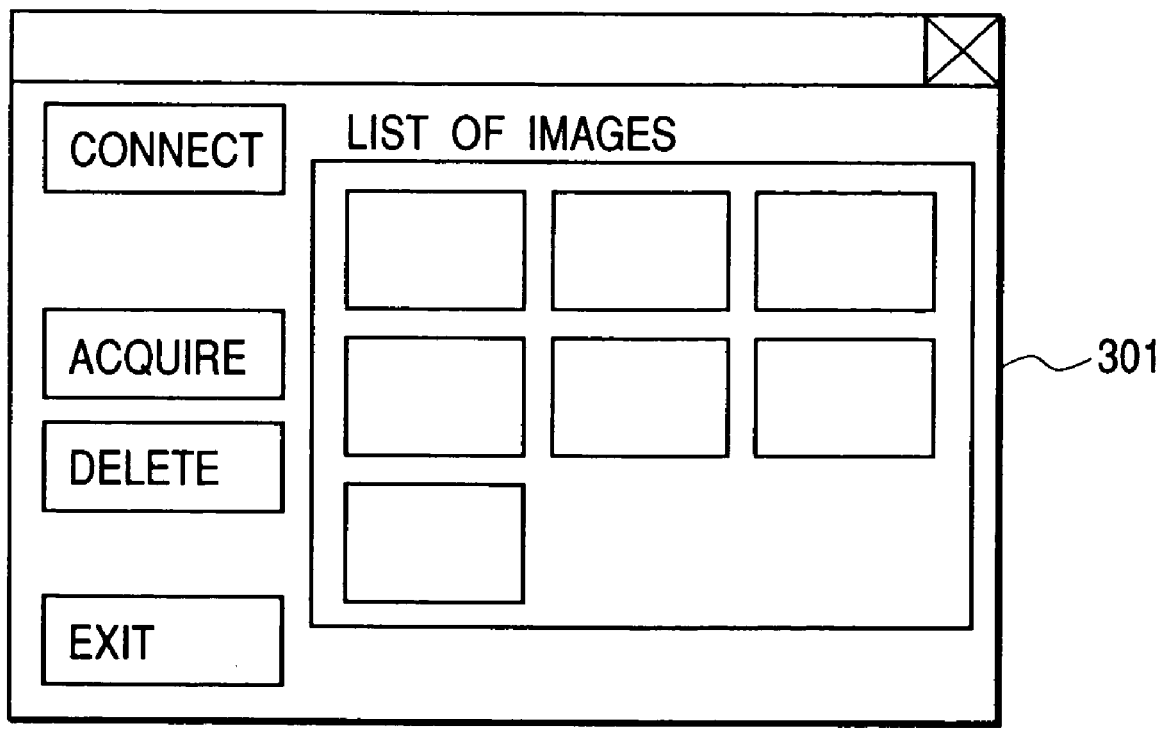
FIG. 7 is a view for explaining the display screen when an English setup has been done by setting the display language in the computer apparatus.

FIG. 6 shows an example of the screen displayed on the CRT monitor 301 by the image capturing software. FIG. 6 shows the screen when the display language is set to be Japanese. When this display language is switched to, e.g., English, the screen contents are displayed in English, as shown in FIG. 7.

The computer apparatus 300 detects the display language setup in the digital camera 200, and automatically sets its display language in accordance with the detection result. For this purpose, the computer apparatus 300 comprises a connection detecting unit 311 for detecting if the digital camera 200 is connected to the USB connector 303, a setting information acquiring unit 312 for acquiring setting information of the display language in the digital camera 200 on the basis of the detection result of the connection detecting unit 311, and a setting changing unit 313 for changing the display language setup in the aforementioned image capturing software 321 on the basis of the setting information acquired by a setting information acquiring unit 312, as shown in, e.g., FIG. 8. These units 311 to 313 are implemented by, e.g., a CPU (not shown) in the computer apparatus 300.

Figure 8:
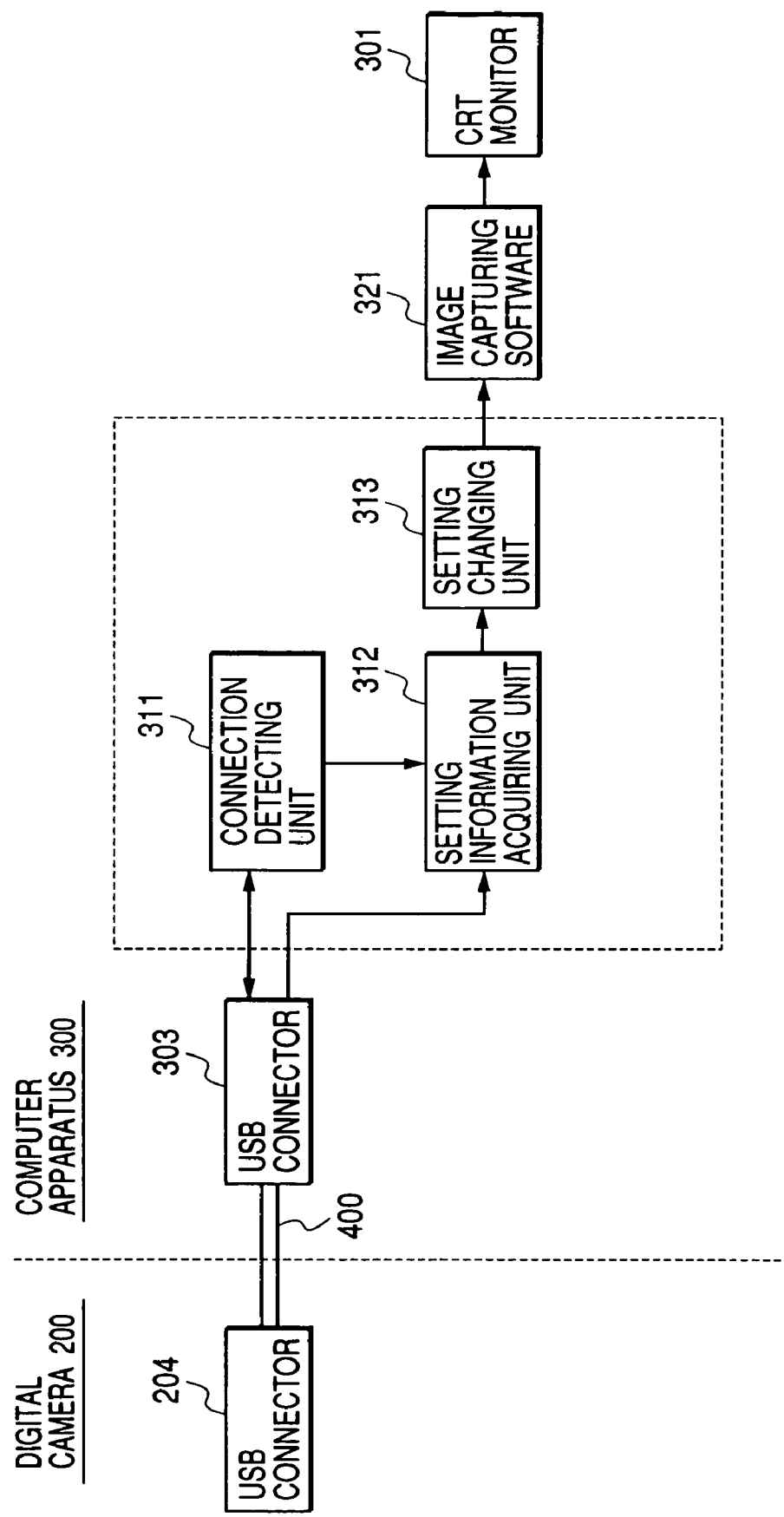
FIG. 8 is a block diagram showing the internal arrangement of the computer apparatus.
Figure 9:
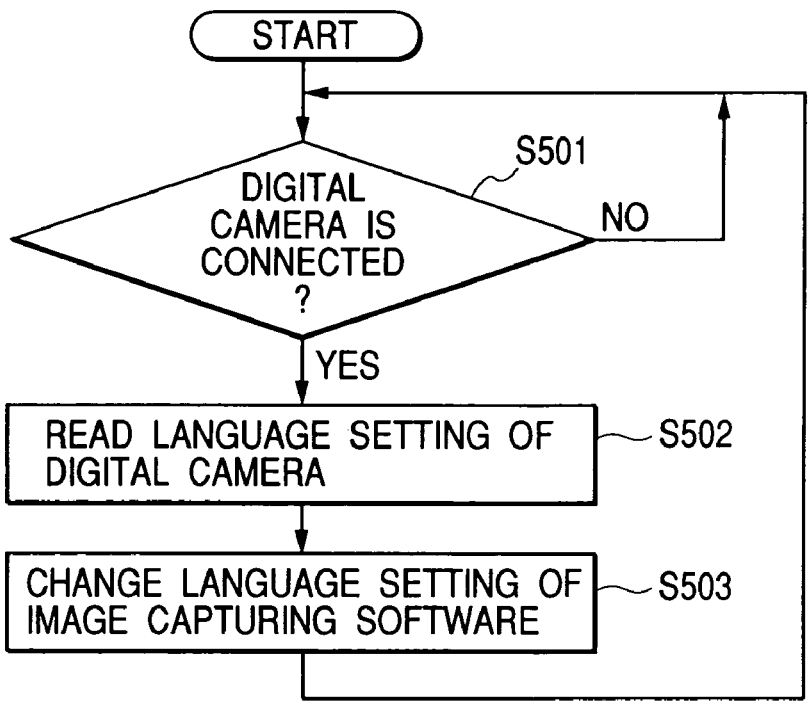
FIG. 9 is a flow chart for explaining the internal operation of the computer apparatus.

FIG. 9 shows the operation of the computer apparatus 300 implemented by the arrangement shown in FIG. 8.

The connection detecting unit 311 checks if the digital camera 200 is connected via the USB connector 303 (step S501). If it is determined that no digital camera 200 is connected, this processing step is repeated.

If it is determined in step S501 that the digital camera 200 is connected, the setting information acquiring unit 312 acquires setting information (setting value) of the display language in the digital camera 200 (step S502).

The setting changing unit 313 changes the display language setup in the image capturing software 321 on the basis of the setting information acquired by the setting information acquiring unit 312 (step S503). With this process, when English is set as the display language in the digital camera 200, as shown in FIGS. 4A and 4B, the display language of the computer apparatus 300 is automatically changed to English, as shown in FIG. 7. After that, the flow returns to step S501 to repeat the aforementioned processing steps.

As described above, in this embodiment, since the computer apparatus 300 detects the display language setup in the digital camera 300 and automatically changes the display language of software that runs on the computer apparatus 300, the user can use the computer apparatus 300 in his or her desired display language by setting such display language in his or her digital camera 200 without setting the display language in the computer apparatus 300. Such feature is particularly effective when a plurality of users share a single computer apparatus 300 or when the user uses the computer apparatus 300 for the first time.

In the above-mentioned embodiment, the display language setup in the image capturing software 321 is changed for the sake of simplicity. However, software whose display language setup is to be changed is not limited to the image capturing software 321 as long as it is launched on the computer apparatus 300.

Second Embodiment

In this embodiment, in the data communication system 100 in the first embodiment mentioned above, an operation description screen of the digital camera 200 in a given operation mode (to be described later) set in the digital camera 200 is displayed on the CRT monitor 301 of the computer apparatus 300.

Figure 10A:
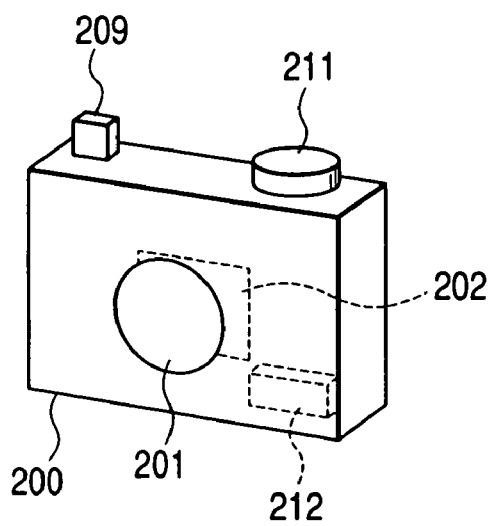
FIGS. 10A and 10B are perspective views for explaining the arrangement of a digital camera in the second embodiment.
Figure 10B:
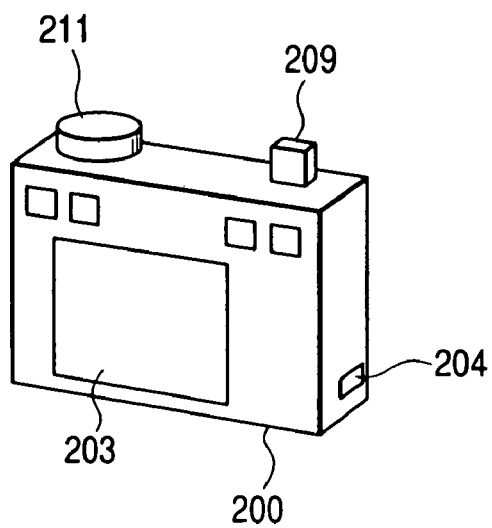

The digital camera 200 of this embodiment has a mode select switch 211 in addition to the arrangement shown in FIGS. 2A and 2B, and includes a memory 212 for storing image data photographed upon pressing the release button 209 or received image data, as shown in FIGS. 10A and 10B. The digital camera 200 can select and set a desired one of, e.g., <transmitting mode>, <receiving mode>, <photographing mode>, and <reproducing mode> using the mode select switch 211 as its operation mode.

The computer apparatus 300 of this embodiment comprises a connection detecting unit 321 for detecting if the digital camera 200 is connected to the USB connector 303, a mode information acquiring unit 322 for acquiring setting information of the operation mode in the digital camera 200 on the basis of the detection result of the connection detecting unit 321, and a screen display control unit 323 for displaying screen information of an operation based on the setting information acquired by the setting information acquiring unit 322 on the CRT monitor 301, as shown in, e.g., FIG. 11. These units 321 to 323 are implemented by, e.g., a CPU (not shown) in the computer apparatus 300.

Figure 12:
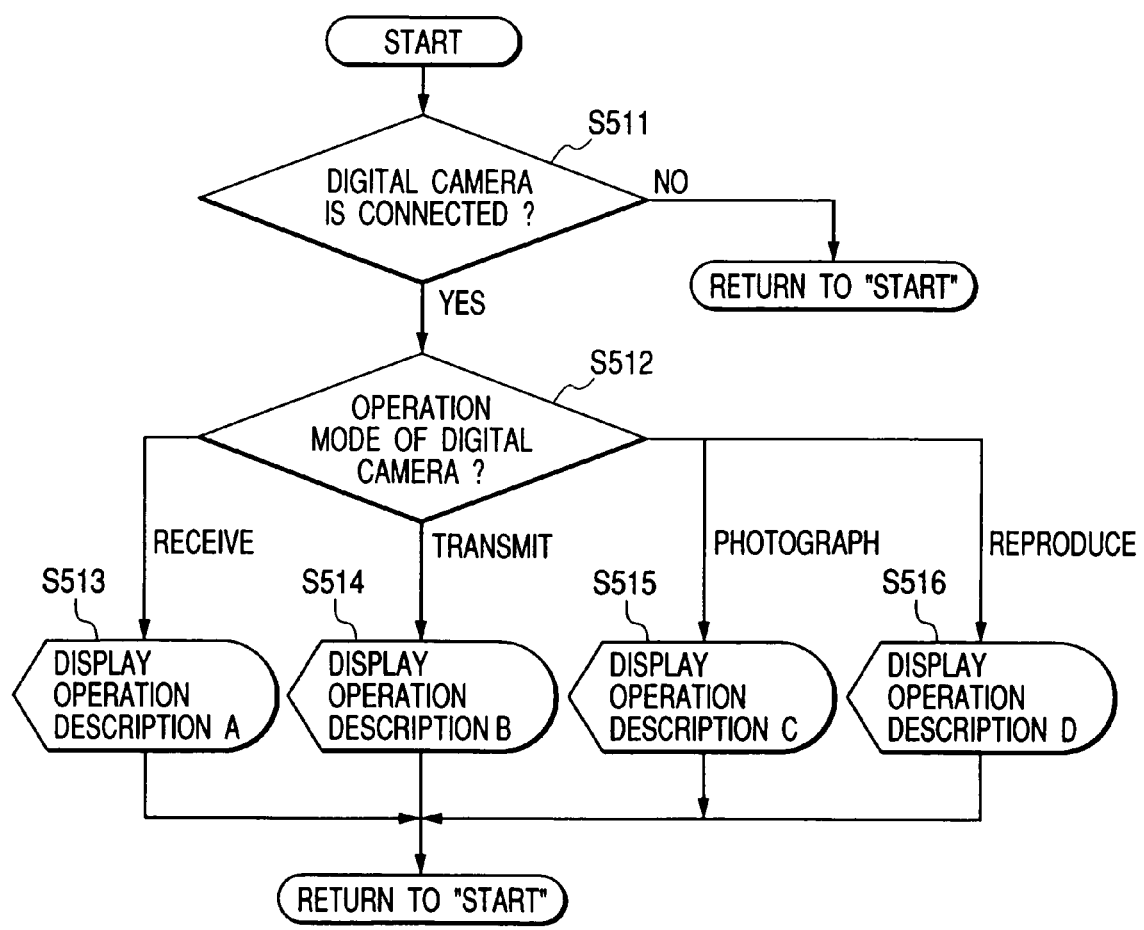
FIG. 12 is a flow chart for explaining the operation of the computer apparatus.

FIG. 12 shows the operation of the computer apparatus 300 implemented by the arrangement shown in FIG. 11.

The connection detecting unit 321 checks if the digital camera 200 is connected via the USB connector 303 (step S511). If it is determined that no digital camera 200 is connected, this processing step is repeated.

If it is determined in step S511 that the digital camera 200 is connected, the mode information acquiring unit 322 acquires operation mode information (setting value of the operation mode) of the digital camera 200. The screen display control unit 323 executes one of processes in steps S513 to S516 on the basis of the mode information acquired by the mode information acquiring unit 322 (step S512).

Figure 13A:
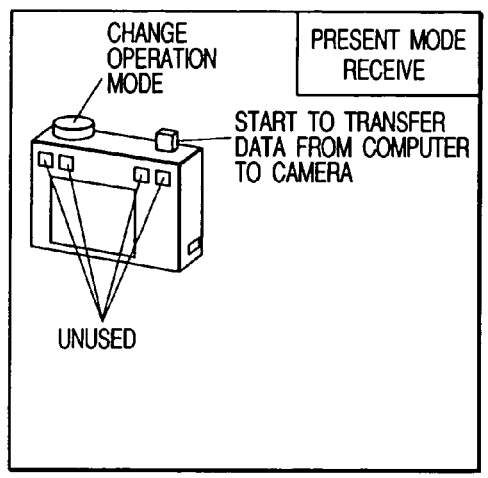
FIGS. 13A, 13B, 13C, and 13D are views for explaining screen contents displayed on the computer apparatus.

Step S513: If <receiving mode> is set as the operation mode of the digital camera 200, the operation description screen of the digital camera 200 in this case is displayed on the CRT monitor 301. At this time, as screen information to be displayed on the CRT monitor 301, operation screen information which is prepared in advance in a memory 324, as shown in FIG. 13A, is used. Therefore, in this case the screen shown in FIG. 13A is displayed on the CRT monitor 301. After that, the flow returns to step S511 to repeat the successive processing steps.

Figure 13B:
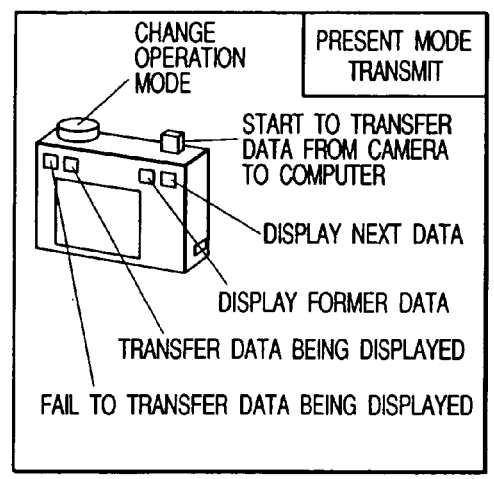

Step S514: If <transmitting mode> is set as the operation mode of the digital camera 200, the operation description screen of the digital camera 200 in this case is displayed on the CRT monitor 301. At this time, as screen information to be displayed on the CRT monitor 301, operation screen information which is prepared in advance in the memory 324, as shown in FIG. 13B, is used. Therefore, in this case the screen shown in FIG. 13B is displayed on the CRT monitor 301. After that, the flow returns to step S511 to repeat the successive processing steps.

Figure 13C:
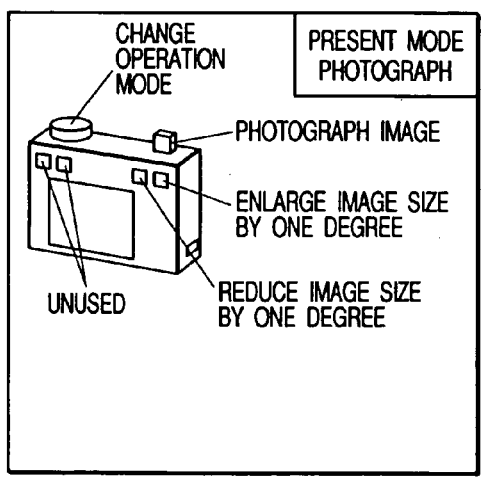

Step S515: If <photographing mode> is set as the operation mode of the digital camera 200, the operation description screen of the digital camera 200 in this case is displayed on the CRT monitor 301. At this time, as screen information to be displayed on the CRT monitor 301, operation screen information which is prepared in advance in the memory 324, as shown in FIG. 13C, is used. Therefore, in this case the screen shown in FIG. 13C is displayed on the CRT monitor 301. After that, the flow returns to step S511 to repeat the successive processing steps.

Figure 13D:
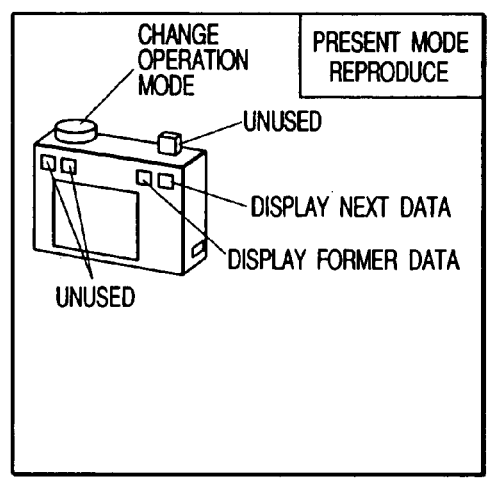

Step S516: If <reproducing mode> is set as the operation mode of the digital camera 200, the operation description screen of the digital camera 200 in this case is displayed on the CRT monitor 301. At this time, as screen information to be displayed on the CRT monitor 301, operation screen information which is prepared in advance in the memory 324, as shown in FIG. 13D, is used. Therefore, in this case the screen shown in FIG. 13D is displayed on the CRT monitor 301. After that, the flow returns to step S511 to repeat the successive processing steps.

As described above, according to this embodiment, since the computer apparatus 300 detects the operation mode of the digital camera 200 and the operation method (see FIGS. 13A to 13D) of the digital camera 200 in that operation mode on the CRT monitor 301, the user can easily and adequately recognize the operation of the digital camera 200, and can appropriately operate it when he or she connects the digital camera 200 to the computer apparatus 300. In this manner, the load on the user can be reduced.

Third Embodiment

Figure 14:
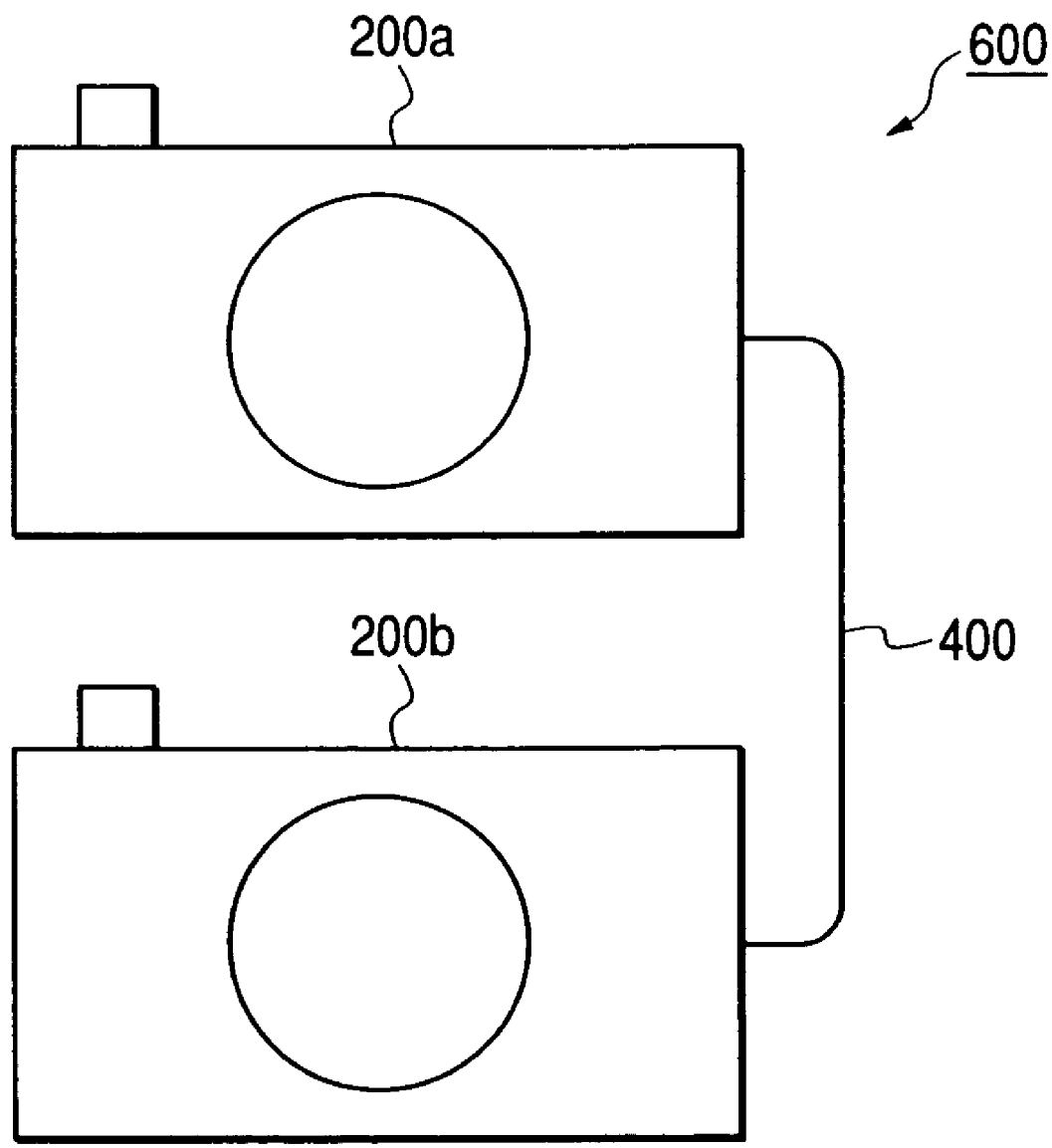
FIG. 14 is a view for explaining the arrangement of a data communication system to which the present invention is applied in the third embodiment.

The present invention is applied to, e.g., a data communication system 600 shown in FIG. 14. In this data communication system 600, two digital cameras 200a and 200b are connectable as information processing apparatuses.

Note that the digital cameras 200a and 200b have the same arrangements, and have both the function of the digital camera 200 and that of the computer apparatus 300 in, e.g., the second embodiment. For this purpose, each of the digital cameras 200a and 200b comprises a connection detecting unit 221 for detecting if another digital camera is connected to the USB connector 204, a mode information acquiring unit 222 for acquiring setting information of the operation modes in digital cameras on the connecting and connected sides on the basis of the detection result of the connection detecting unit 221, a screen display control unit 223 for displaying operation information based on the setting information acquired by the setting information acquiring unit 222 on the liquid crystal monitor 203, and a receiving/transmitting unit 224 for transmitting/receiving data to/from another digital camera connected to the USB connector 204, as shown in, e.g., FIG. 15. These units 221 to 224 are implemented by a CPU (not shown) in the digital camera.

Figure 15:
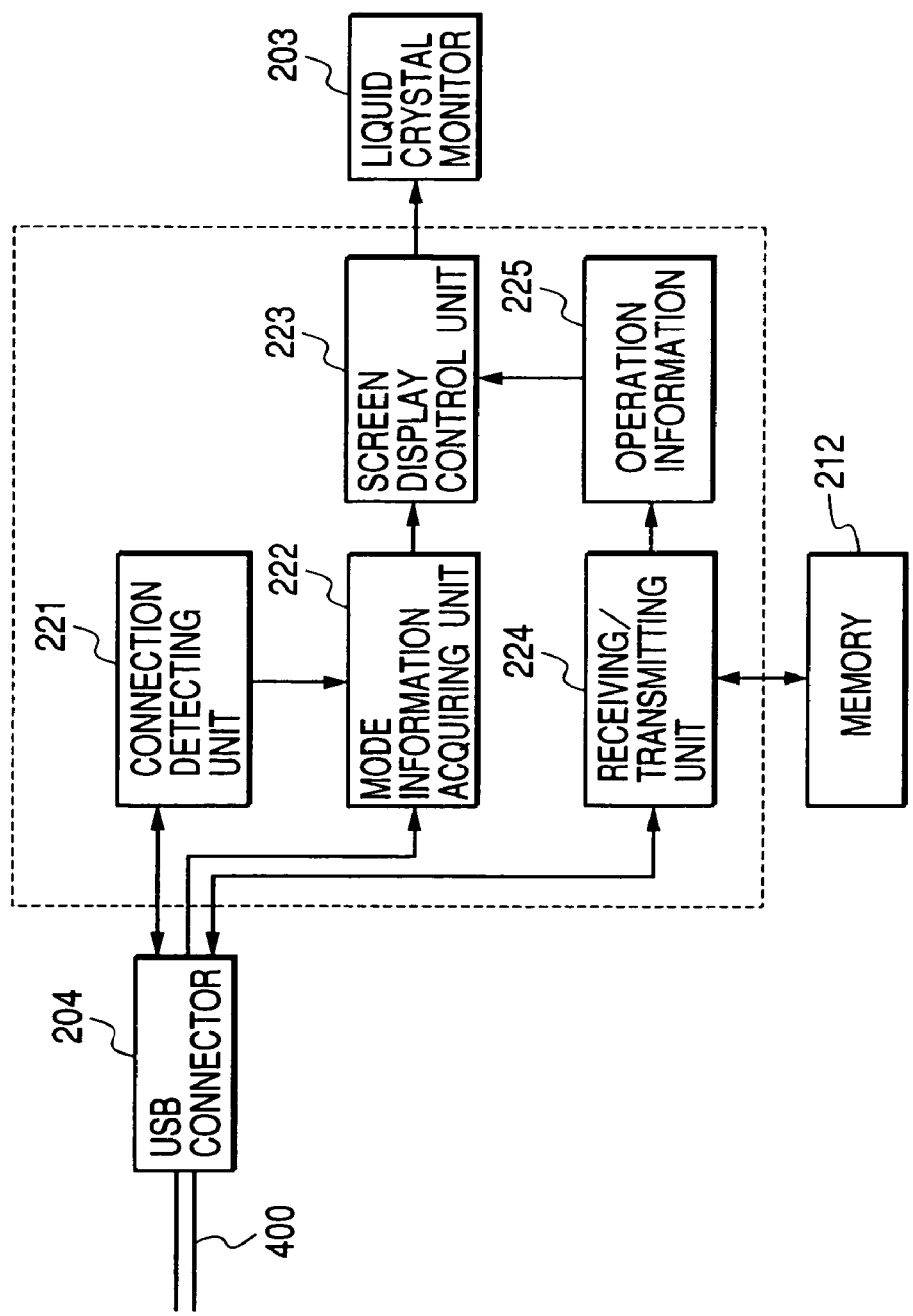
FIG. 15 is a block diagram showing the internal arrangement of a digital camera in the data communication system.
Figure 16:
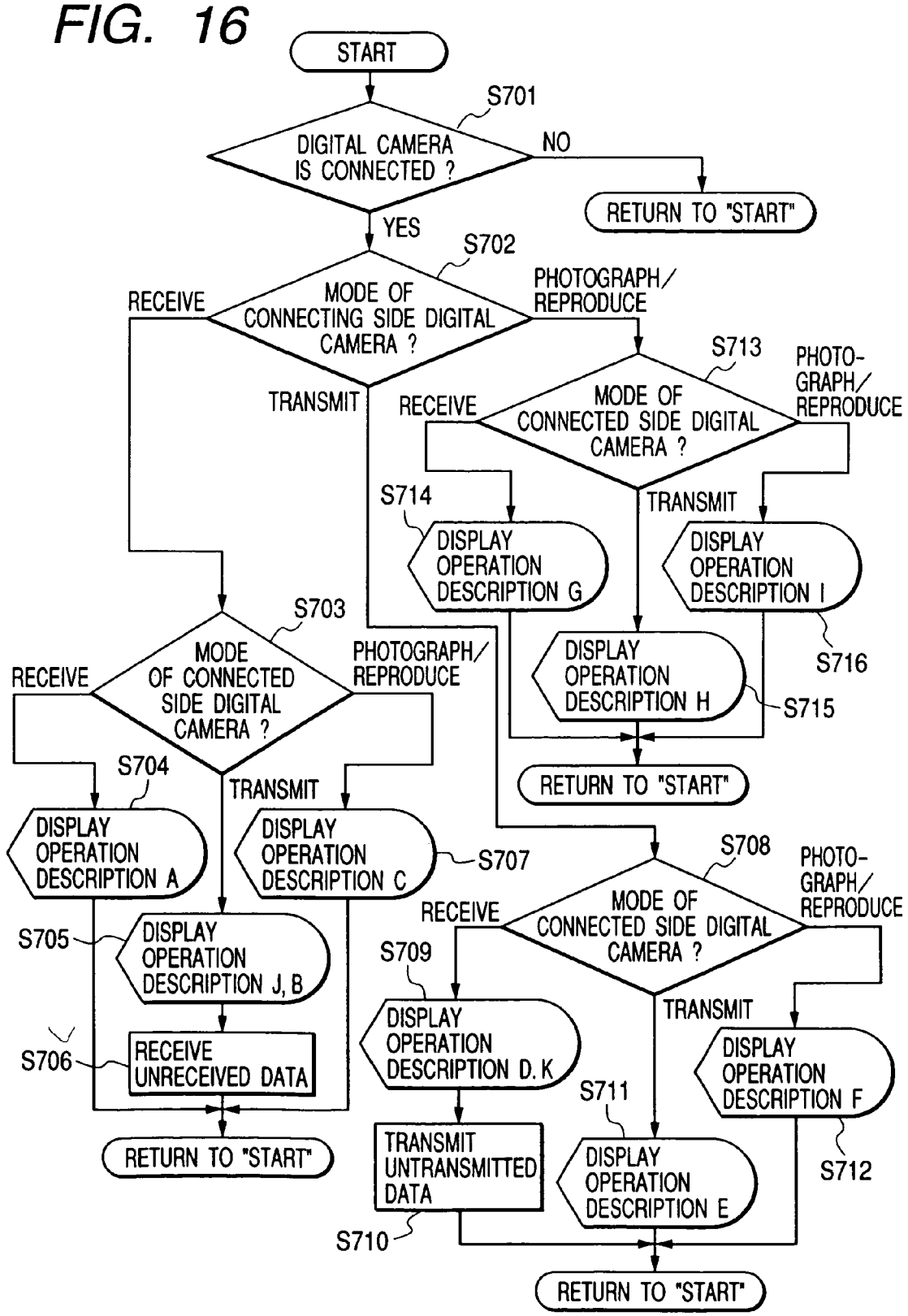
FIG. 16 is a flow chart for explaining the operation of the digital camera.

FIG. 16 shows the operation of the digital cameras 200a and 200b implemented by the arrangement shown in FIG. 15.

The connection detecting unit 221 checks if another digital camera is connected via the USB connector 204 (step S701). If it is determined that no digital camera is connected, this processing step is repeated.

If it is determined in step S701 that another digital camera is connected, the mode information acquiring unit 222 acquires operation mode information of the self camera (to be referred to as an "operation mode of the connecting side" hereinafter) and also operation mode information of the other digital camera connected via the USB connector 204 (to be referred to as an operation mode of the connected side" hereinafter). The screen display control unit 223 and receiving/transmitting unit 224 execute one of processes in steps S703, S708, and S713 on the basis of the operation modes of the connecting and connected sides acquired by the mode information acquiring unit 222 (step S702).

Steps S703 and S707: If <receiving mode> is set as the operation mode of the connecting side, the screen display control unit 223 and receiving/transmitting unit 224 execute one of the processes in steps S704, S705, and S707 on the basis of the operation mode of the connected side (step S703).

Figure 17A:
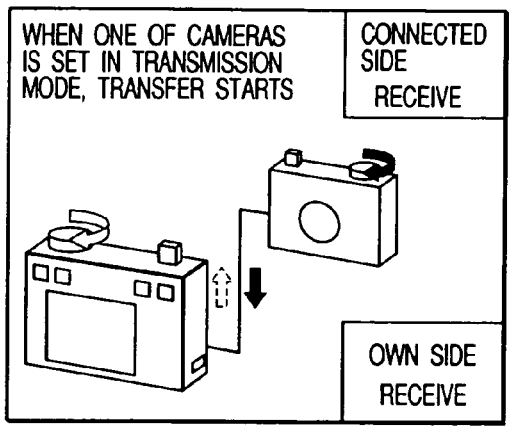
FIGS. 17A, 17B, 17C, 17D, 17E, and 17F are views for explaining screen contents (a to f) displayed on the digital camera.

Step S704: If <receiving mode> is set as the operation mode of the connected side, the screen display control unit 223 displays operation description screens of the digital cameras 200a and 200b at that time on their liquid crystal monitors 203. As the screen information to be displayed on the liquid crystal monitor 203 on the receiving side, operation screen information, which is prepared in advance in a memory 225, as shown in, e.g., FIG. 17A, is used. Therefore, in this case the screen contents shown in FIG. 17A are displayed on the liquid crystal monitor 203. After that, the flow returns to step S701 to repeat the subsequent processing steps.

Figure 17B:
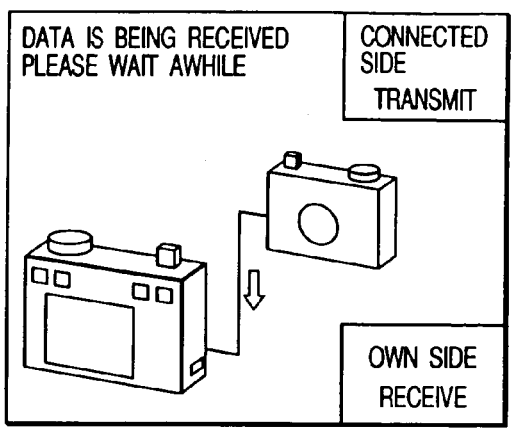
Figure 18G:
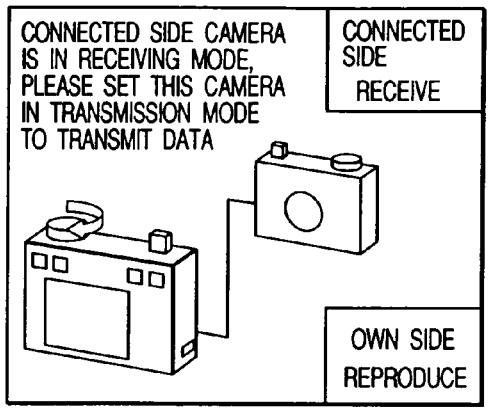
FIGS. 18G, 18H, 18I, 18J, and 18K are views for explaining screen contents (g to k) displayed on the digital camera.
Figure 18H:
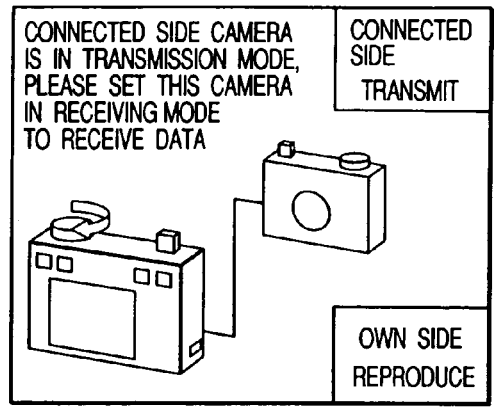
Figure 18I:
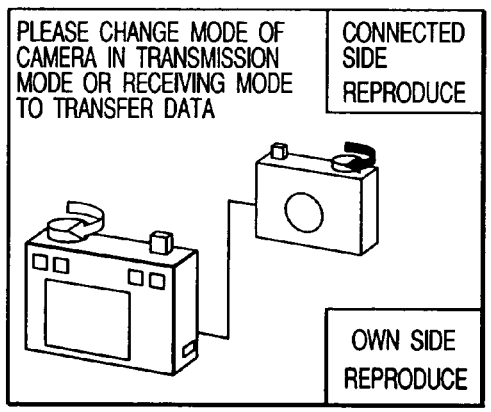
Figure 18J:
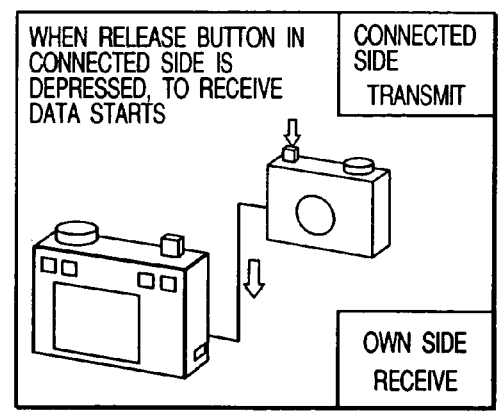

Steps S705 and S706: If <transmitting mode> is set as the operation mode of the connected side, the screen display control unit 223 displays operation description screens of the digital cameras 200a and 200b at that time on their liquid crystal monitors 203. As the screen information to be displayed on the liquid crystal monitor 203 on the receiving side, two pieces of operation screen information, which are prepared in advance in the memory 225, as shown in, e.g., FIGS. 17B and 18J, are used. Therefore, in this case the screen contents shown in FIG. 18J are displayed, and when the release button on the connected side is pressed after that, the screen contents shown in FIG. 17B are displayed on the liquid crystal monitor 203 (step S705). The receiving/transmitting unit 224 receives data transmitted from the connected side digital camera, and records it in the memory 212 (step S706). Upon completion of reception and recording of all data, the flow returns to step S701 to repeat the subsequent processing steps.

Figure 17C:
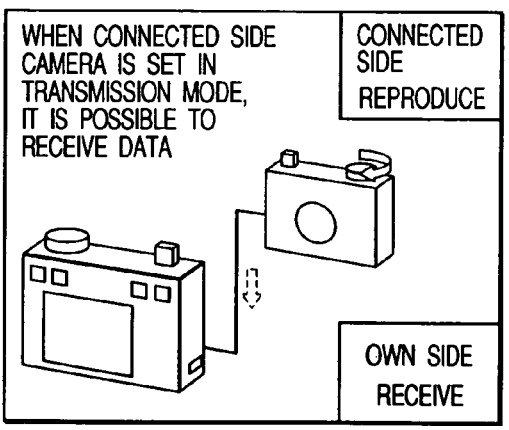

Step S707: If <photographing mode> or <reproducing mode> is set as the operation mode of the connected side, the screen display control unit 223 displays operation description screens of the digital cameras 200a and 200b at that time on their liquid crystal monitors 203. As the screen information to be displayed on the liquid crystal monitor 203 on the receiving side, operation screen information, which is prepared in advance in the memory 225, as shown in, e.g., FIG. 17C, is used. Therefore, in this case the screen contents shown in FIG. 17C are displayed on the liquid crystal monitor 203. After that, the flow returns to step S701 to repeat the subsequent processing steps.

Step S708 and S712: If <transmitting mode> is set as the operation mode of the connecting side, the screen display control unit 223 and receiving/transmitting unit 224 execute one of processes in steps S709 and S712 on the basis of the operation mode of the connected side (step S708).

Figure 17D:
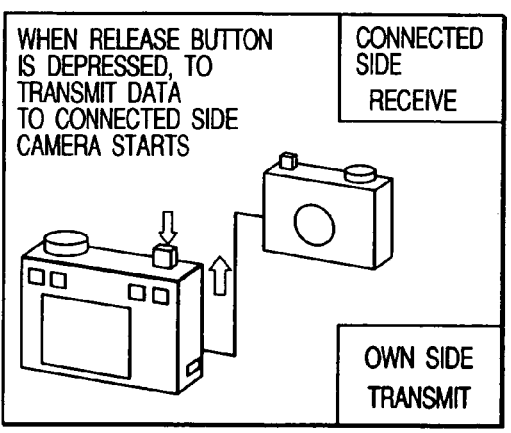
Figure 18K:
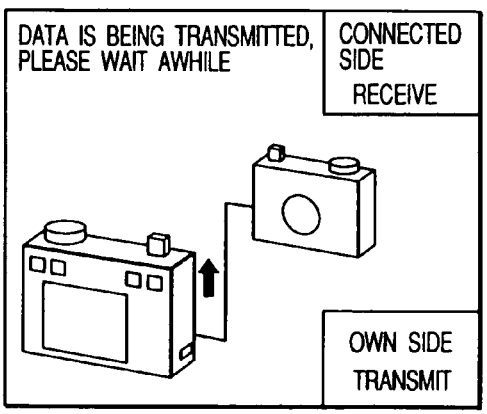

Steps S709 and S710: If <receiving mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203 on the receiving side, two pieces of operation screen information, which are prepared in advance in the memory 225, as shown in, e.g., FIGS. 17D and 18K, are used. Therefore, in this case the screen contents shown in FIG. 17D are displayed on the liquid crystal monitor 203, and when the release button on the transmitting side is pressed after that, the screen contents shown in FIG. 18K are displayed (step S709). The transmitting/receiving unit 224 transmits data in the memory 212 to the connected side digital camera (step S710). Upon completion of transmission of all data, the flow returns to step S701 to repeat the subsequent processing steps.

Figure 17E:
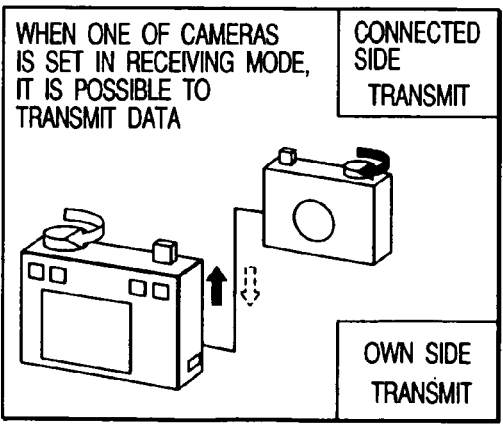

Step S711: If <transmitting mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203, operation screen information, which is prepared in advance in the memory 225, as shown in, e.g., FIG. 17E, is used. Therefore, in this case the screen contents shown in FIG. 17E are displayed on the liquid crystal monitor 203. After that, the flow returns to step S701 to repeat the subsequent processing steps.

Figure 17F:
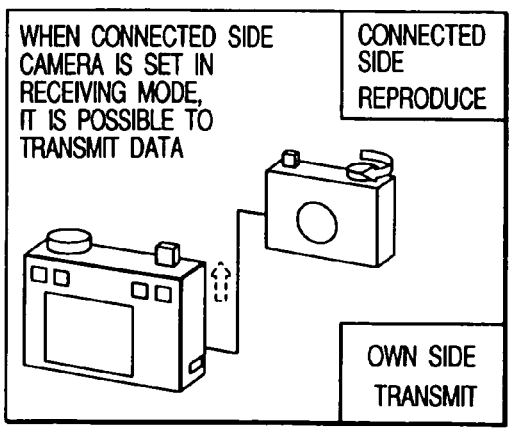

Step S712: If <photographing mode> or <reproducing mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203, operation screen information, which is prepared in advance in the memory 225, as shown in, e.g., FIG. 17F, is used. Therefore, in this case the screen contents shown in FIG. 17F are displayed on the liquid crystal monitor 203. After that, the flow returns to step S701 to repeat the subsequent processing steps.

Step S713: If <photographing mode> or <reproducing mode> is set as the operation mode of the connecting side, the screen display control unit 223 and receiving/transmitting unit 224 execute one of processes in steps S714, S715, and S716 on the basis of the operation mode of the connected side (step S713).

Step S714: If <receiving mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203 on the connected side, operation screen information, which is prepared in advance in the memory 225, as shown in, e.g., FIG. 18G, is used. Therefore, in this case the screen contents shown in FIG. 18G are displayed on the liquid crystal monitor 203. After that, the flow returns to step S701 to repeat the subsequent processing steps.

Step S715: If <transmitting mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203, operation screen information, which is prepared in advance in the memory 225, as shown in, e.g., FIG. 18H, is used. Therefore, in this case the screen contents shown in FIG. 18H are displayed on the liquid crystal monitor 203. After that, the flow returns to step S701 to repeat the subsequent processing steps.

Step S716: If <photographing mode> or <reproducing mode> is set as the operation mode of the connected side, the screen display control unit 223 displays operation description screens of the digital cameras 200*a* and 200*b* at that time on their liquid crystal monitors 203. As the screen information to be displayed on the liquid crystal monitor 203, operation screen information, which is prepared in advance in the memory 225, as shown in, e.g., FIG. 18I, is used. Therefore, in this case the screen contents shown in FIG. 18I are displayed on the liquid crystal monitors 203 of both the cameras. After that, the flow returns to step S701 to repeat the subsequent processing steps.

Since the aforementioned processes are respectively executed in the digital cameras 200*a* and 200*b*, for example, when the digital camera 200*a* is set in <transmitting mode>, and the digital camera 200*b* is set in <photographing mode>, and these cameras are connected via the USB cable 400, the operation description screen shown in FIG. 17F is displayed on the liquid crystal monitor of the digital camera 200*a*, and that shown in FIG. 18H is displayed on the liquid crystal monitor of the digital camera 200*b*. On the other hand, when both the digital cameras 200*a* and 200*b* are set in <receiving mode>, the operation description screen shown in FIG. 17A is displayed on the liquid crystal monitors of both the cameras.

As described above, according to this embodiment, since the digital camera detects the operation mode of another digital camera connected via the USB cable 400 together with its own operation mode, and displays operation methods on the two digital cameras on the basis of these operation modes, the user can easily and adequately recognize the operation of the digital camera 200, and can appropriately operate it when he or she connects another digital camera to his or her camera via the USB cable 400. In this manner, the load on the user can be reduced.

In this embodiment, the digital cameras 200*a* and 200*b* are not limited to identical models, but may be different ones as long as they can communicate with each other and are designed to make similar operations.

Fourth Embodiment

In the first embodiment described above, when the digital camera 200 is connected to the computer apparatus 300, the screen contents including the operation method of the digital camera 200 shown in FIGS. 13A to 13D are displayed on the CRT monitor 301 of the computer apparatus 300. By contrast, in this embodiment, when the digital camera 200 is connected to the computer apparatus 300, the screen contents shown in, e.g., FIG. 19 are displayed on the CRT monitor 301 of the computer apparatus 300, and an operation from this screen and an operation according to the operation mode of the digital camera are made.

Figure 19:
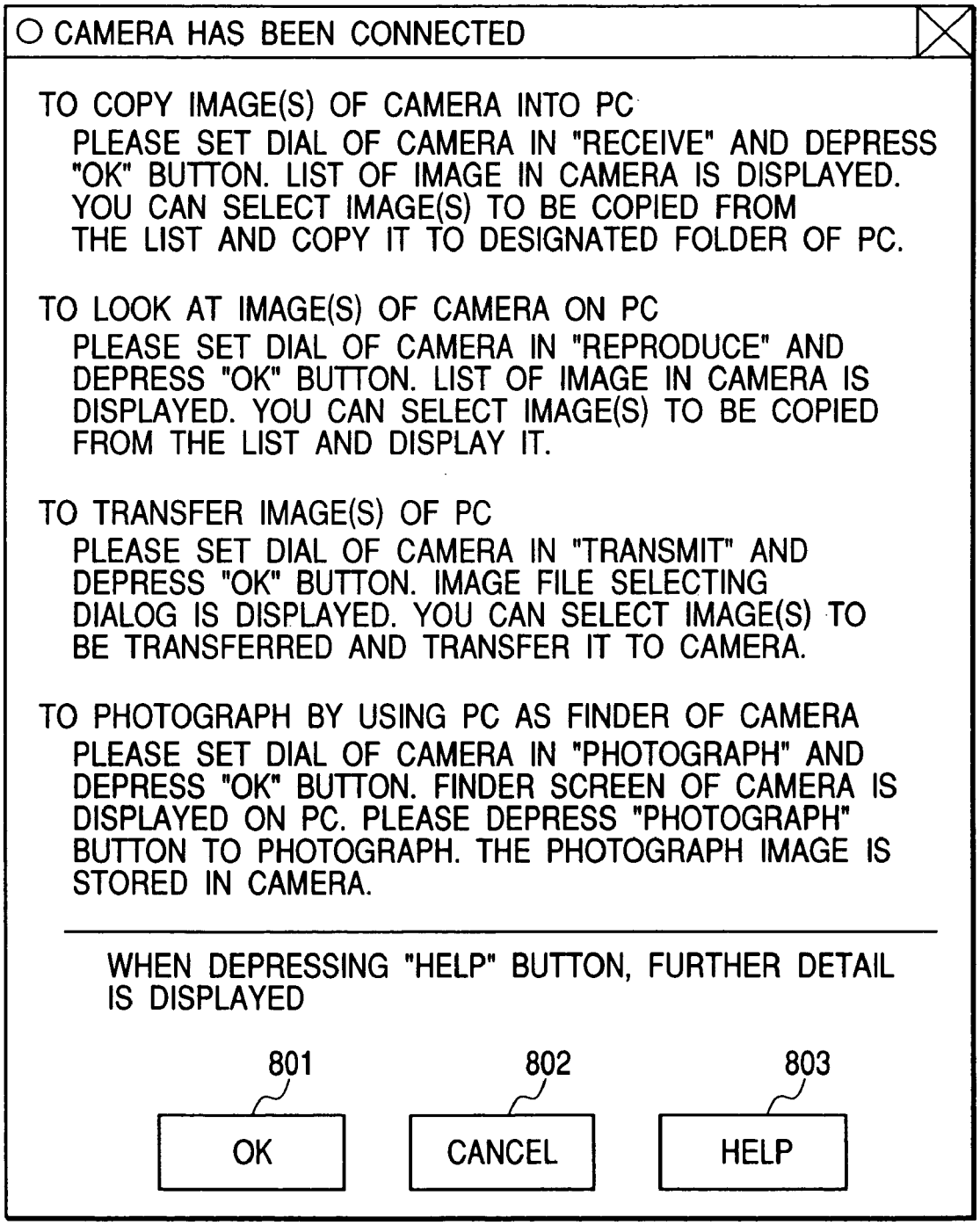
FIG. 19 is a view for explaining the screen displayed on a computer apparatus in the fourth embodiment.
Figure 20:
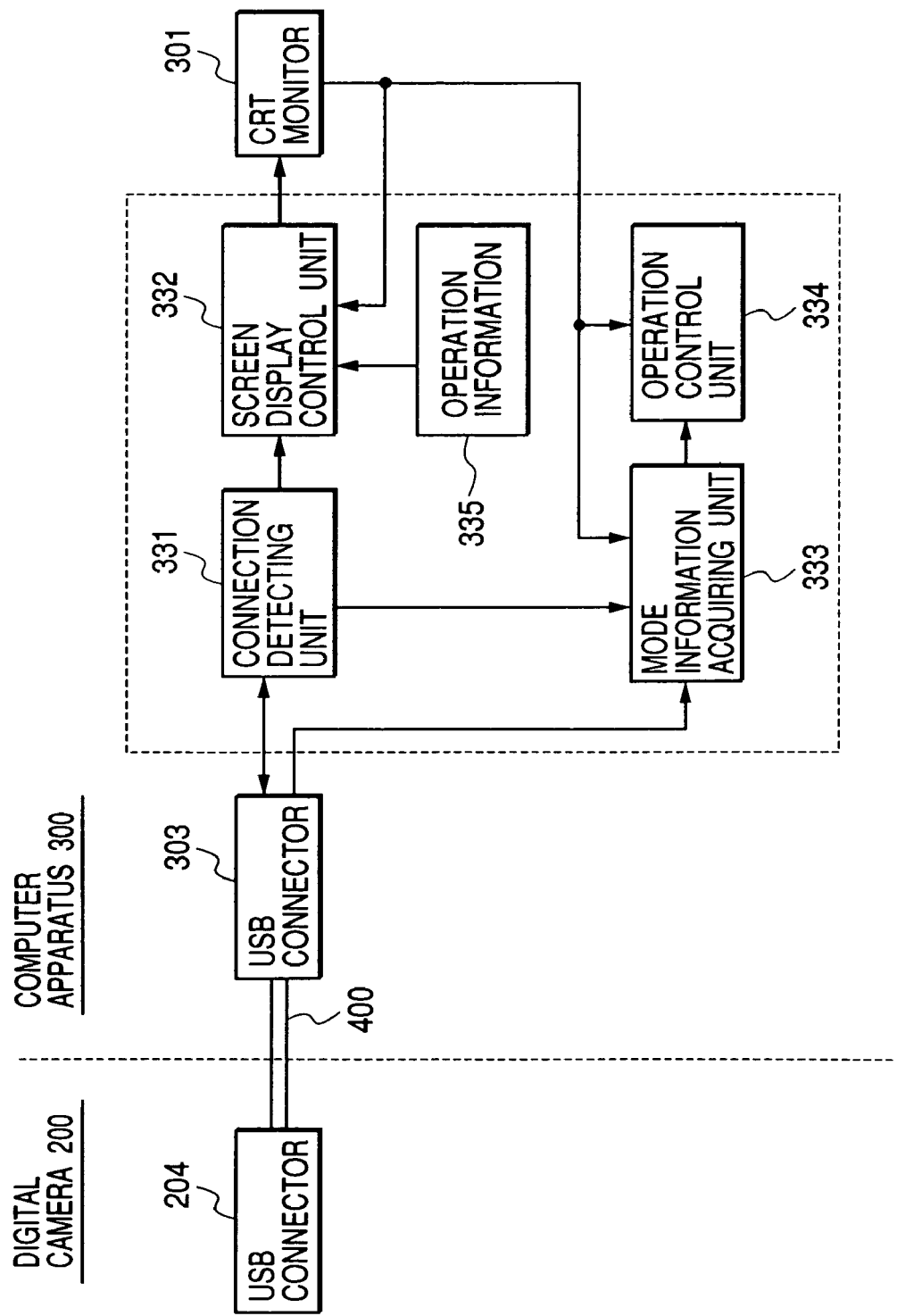
FIG. 20 is a block diagram showing the internal arrangement of the computer apparatus.

For this purpose, the computer apparatus 300 of this embodiment comprises a connection detecting unit 331 for detecting if the digital camera 200 is connected to the USB connector 303, a screen display control unit 332 for displaying the screen contents shown in FIG. 19 on the CRT monitor 301 on the basis of the detection result of the connection detecting unit 331, a mode information acquiring unit 333 for acquiring setting information of the operation mode in the digital camera 200 on the basis of an operation on the display screen by the screen display control unit 332, and an operation control unit 334 for making operation control for a receiving process, transmitting process, photographing process, reproducing process, and the like on the basis of the operation on the display screen by the screen display control unit 332 and the setting information acquired by the setting information acquiring unit 333, as shown in, e.g., FIG. 20. These units 331 to 334 are implemented by, e.g., a CPU (not shown) in the computer apparatus 300.

FIG. 21 shows the operation of the computer apparatus 300 implemented by the arrangement shown in FIG. 20.

The connection detecting unit 331 checks if the digital camera 200 is connected via the USB connector 303 (step S521). If it is determined that no digital camera 200 is connected, this processing step is repeated.

If it is determined in step S521 that the digital camera 200 is connected, the screen display control unit 332 displays the screen shown in FIG. 19 on the CRT monitor 301. This screen information is prepared in advance in a memory 335 (step S522).

The user operates according to the screen contents displayed on the CRT monitor 301. More specifically, the screen displayed on the CRT monitor 301 at that time is composed of a sequence description window provided with an OK button 801, cancel button 802, and help button 803 together with the operation method display region. Therefore, the use presses a required one of the OK button 801, cancel button 802, and help button 803 using the mouse 305 or the like. This operation information is supplied to the screen display control unit 332, mode information acquiring unit 333, and operation control unit 334. The screen display control unit 332, mode information acquiring unit 333, and operation control unit 334 execute processes in steps S523 to S529 on the basis of the operation on the screen shown in FIG. 19.

Steps S523 and S524: If the button that has been operated on the screen shown in FIG. 19 is the help button 803 (step S523), the screen display control unit 332 displays details of the operation method on the CRT monitor 301 (step S524). As screen information to be displayed on the CRT monitor 301 at that time, operation screen information prepared in advance in, e.g., the memory 335 is used. After that, the flow returns to step S523 to repeat the subsequent processing steps. On the other hand, if the cancel button 802 has been pressed on the screen shown in FIG. 19, this process ends. Also, if the OK button 801 has been pressed on the screen shown in FIG. 19, the control advances to processes in step S525 an subsequent steps.

Steps S525 to S529: If the OK button 801 has been pressed on the screen shown in FIG. 19, the mode information acquiring unit 333 acquires operation mode information (setting value of the operation mode) of the digital camera 200. The operation control unit 334 executes one of processes in steps S526 to S529 on the basis of the mode information acquired by the mode information acquiring unit 322 (step S525). That is, the operation control unit 334 executes operation control for a receiving process (step S526) if <receiving mode> is set as the operation mode of the digital camera 200; that for a transmitting process (step S527) if <transmitting mode> is set; that for a photographing process (step S528) if <photographing mode> is set; or that for a reproducing process (step S529) if <reproducing mode> is set.

With the aforementioned arrangement, the user can easily and adequately recognize the operation of the digital camera 200, and can appropriately operate it when he or she connects the digital camera 200 to the computer apparatus 300, as in the effects in the first and second embodiments. In this manner, the load on the user can be reduced.

In steps S526 to S529 in the fourth embodiment mentioned above, processes for displaying the screen contents (see FIGS. 13A to 13D) of the operation methods corresponding to the operation modes of the digital camera 200 may be added as in the second embodiment mentioned above. Also, the fourth embodiment can be applied to the arrangement of the third embodiment (the arrangement that connects the digital cameras 200a and 200b, each of which has both the function of the digital camera 200 and that of the computer apparatus 300).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a ROM, floppy disk, hard disk, optical disk, magneto-optical disk, CD-ROM, CD-R, magnetic tape, non-volatile memory card, ROM, and the like may be used. The functions of the above-mentioned embodiments may be implemented not only by executing the readout program code by the computer but also by some or all of actual processes executed by an OS running on the computer on the basis of an instruction of the program code. Furthermore, the functions of the above-mentioned embodiments may be implemented by some or all of actual processes executed by a CPU or the like arranged in a function extension board or a function extension unit, which is inserted in or connected to the computer, after the program code read out from the storage medium is written in a memory of the extension board or unit.

As described above, according to the present invention, operation for making setups in the computer apparatus can be omitted. Such effect is particularly effective when a plurality of users share a single computer apparatus or when the user uses the computer apparatus for the first time.

For example, even when the setup of a given user is different from that of the previous user, that user need not make new setting processes.

Also, since the setup can be changed by connecting an external apparatus and only a few operations are required, the computer apparatus is easy and convenient to operate. Especially, when the user goes on a trip abroad, and a display language different from that in his or her country is set, he or she cannot often understand operation methods. In such case, it is very convenient if one can change setups by only connecting an external apparatus. When the display language setup is changed as the setup to be changed, a display language used by the user can be set. Especially, since the connected external apparatus is normally set with a display language the user can understand, it is preferable to change the setup in accordance with that in the external apparatus.

When the external apparatus to be connected is a portable terminal apparatus, since it is likely to be connected to another information processing apparatus very often, setup operation steps can be greatly reduced by exploiting the present invention.

When the present invention is applied to an apparatus which can selectively use a plurality of operation modes, if the setup of that apparatus is changed or the operation method is displayed in correspondence with the selected operation mode, the user can operate an apparatus he or she does not know how to operate, by connecting his or her apparatus to that apparatus.

In particular, since the user is highly likely to carry a portable information terminal having an image sensing unit such as a digital camera on a trip, such terminal is very often connected to another information processing apparatus in various locations and situations, and setup operation steps can be greatly reduced under such circumstance. Even when the terminal is connected to an apparatus the user does not know how to operate, since the operation method is displayed or an application to be used is automatically launched, the user can operate such apparatus.

Since the operation method of an apparatus is displayed in correspondence with the operation mode, the user can easily and adequately recognize the operation method. Such function is particularly effective for a user who is not accustomed to a computer apparatus, portable terminal apparatus, or the like.

The present invention is not limited to the above embodiments, and various modifications may be made within the scope of the claims.

What is claimed is:

1. An information processing system which includes a first information processing apparatus and a second information processing apparatus which are mutually connected to each other and that communicate with each other
    wherein said first information processing apparatus comprises:
    a first operation state detecting unit constructed to detect an operation state of said first information processing apparatus;
    a second operation state detecting unit constructed to detect an operation state of said second information processing apparatus; and
    a first display control unit constructed to perform control to display operation explanation information including an operation explanation of how to operate said second information processing apparatus in the operation states detected by said first operation state detecting unit and said second operation state detecting unit, and to display the operation state of said second information processing apparatus,
    and wherein said second information processing apparatus comprises:
    a third operation state detecting unit constructed to detect the operation state of said second information processing apparatus;
    a fourth operation state detecting unit constructed to detect the operation state of said first information processing apparatus; and
    a second display control unit constructed to perform control to display operation explanation information including an operation explanation of how to operate said first information processing apparatus in the operation states detected by said third operation state detecting unit and said fourth operation state detecting unit, and to display the operation state of said first information processing apparatus,
    wherein a content to be displayed by said first display control unit and a content to be displayed by said second display control unit are mutually different from each other.

2. An apparatus according to claim 1, wherein said second operation state detecting unit detects a change in operation mode of the second information processing apparatus.

3. An apparatus according to claim 1, wherein the second information processing apparatus comprises a portable apparatus which can selectively use a plurality of operation modes.

4. An apparatus according to claim 1, wherein at least either one of the second information processing apparatus and said first information processing apparatus is a digital imaging device.

5. An apparatus according to claim 1, wherein, in the second information processing apparatus, a function of at least one operation means differs according to the operation state.

6. An operation control method for an information processing system which includes a first information processing apparatus and a second information processing apparatus which are mutually connected to each other and that communicate with each other, comprising:
    in the first information processing apparatus,
    a first operation state detecting step of detecting an operation state of the first information processing apparatus;
    a second operation state detecting step of detecting an operation state of the second information processing apparatus; and
    a first display control step of performing control to display operation explanation information including an operation explanation of how to operate the second information processing apparatus in the operation states detected in the first operation state detecting step and the second operation state detecting step, and to control to display the operation state of the second information processing apparatus,
    and in the second information processing apparatus,
    a third operation state detecting step of detecting the operation state of the second information processing apparatus;
    a fourth operation state detecting step of detecting the operation state of the first information processing apparatus; and
    a second display control step of performing control to display operation explanation information including an operation explanation of how to operate the first information processing apparatus in the operation states detected by the third operation state detecting step and the fourth operation state detecting step, and to control to display the operation state of the first information processing apparatus,
    wherein a content to be displayed by the first display control step and a content to be displayed by the second display control step are mutually different from each other.

7. A method according to claim 6, wherein the second operation state detecting step includes a step of detecting a change in operation mode of the second information processing apparatus.

8. A method according to claim 6, wherein the second information processing apparatus comprises a portable apparatus which can selectively use a plurality of operation modes.

9. A method according to claim 6, wherein the second information processing apparatus is a portable apparatus having image sensing means.

10. A method according to claim 6, wherein the first information processing apparatus is a digital imaging device.

11. A computer readable storage medium on which are stored computer readable processing steps of an operation control method for an information processing system which includes a first information processing apparatus and a second information processing apparatus which are mutually connected to each other and that communicate with each other, the processing steps comprising:
    in the first information processing apparatus,
    a first operation state detecting step of detecting an operation state of the first information processing apparatus;
    a second operation state detecting step of detecting an operation state of the second information processing apparatus; and a first display control step of performing control to display operation explanation information including an operation explanation of how to operate the second information processing apparatus in the operation states detected in the first operation state detecting step and the second operation state detecting step, and to control to display the operation state of the second information processing apparatus, and in the second information processing apparatus, a third operation state detecting step of detecting the operation state of the second information processing apparatus;

a fourth operation state detecting step of detecting the operation state of the first information processing apparatus; and a second display control step of performing control to display operation explanation information including an operation explanation of how to operate the first information processing apparatus in the operation states detected by the third operation state detecting step and the fourth operation state detecting step, and to control to display the operation state of the first information processing apparatus, wherein a content to be displayed by the first display control step and a content to be displayed by the second display control step are mutually different from each other.

12. A digital imaging device which is mutually connected to an information processing apparatus in a communicable state, comprising:

a first operation state detecting unit constructed to detect an operation state of the digital imaging device;

a second operation state detecting unit constructed to detect an operation state of said information processing apparatus; and a first display control unit constructed to perform control to display operation explanation information including an operation explanation of how to operate the information processing apparatus in the operation states detected by said first operation state detecting unit and said second operation state detecting unit, and to control to display the operation state of said information processing apparatus, wherein said information processing apparatus comprises:

a third detecting unit constructed to detect an operation state of said information processing apparatus;

a fourth operation state detecting unit constructed to detect the operation state of said digital image device; and a second display control unit constructed to perform control to display operation explanation information including an operation explanation of how to operate the digital imaging device in the operation states detected by the third operation state detecting unit and the fourth operation state detecting unit, and to display the operation state of the digital imaging device, and wherein a content to be displayed by the first display control unit and the second display control unit are mutually different from each other.

\* \* \* \* \*